Oct. 6, 1942.  A. F. SPILHAUS  2,297,725
BATHYTHERMOGRAPH
Filed Aug. 10, 1938  3 Sheets-Sheet 1

INVENTOR.
Athelstan F. Spilhaus
BY
ATTORNEY.

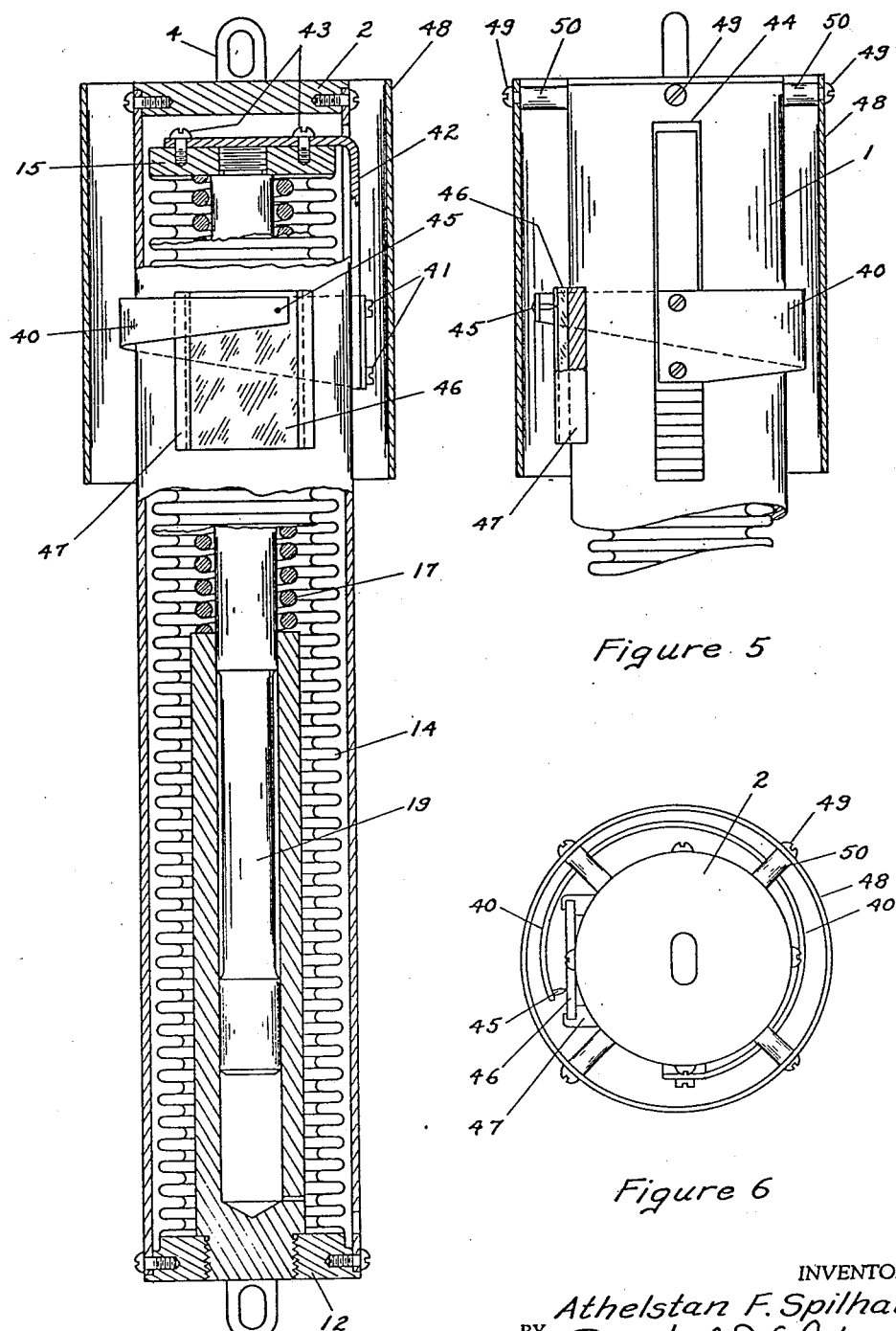

Oct. 6, 1942.  A. F. SPILHAUS  2,297,725
BATHYTHERMOGRAPH
Filed Aug. 10, 1938  3 Sheets-Sheet 3

INVENTOR.
Athelstan F. Spilhaus
BY
ATTORNEY.

Patented Oct. 6, 1942

2,297,725

UNITED STATES PATENT OFFICE 2,297,725

BATHYTHERMOGRAPH

Athelstan F. Spilhaus, University Heights, N. Y., assignor to Submarine Signal Company, Boston, Mass., a corporation of Maine Application August 10, 1938, Serial No. 224,074

7 Claims. (Cl. 73—345)

The present invention relates to a bathythermograph, that is a device for measuring ocean temperature and hydrostatic pressure at varying depths, and more particularly for measuring and recording the variation of ocean temperature with depth.

It is often desirable for many scientific purposes to be able to ascertain the temperature gradient in various parts of the ocean and to be able to obtain this information in the form of a continuous record of temperature against pressure in the surface layers of the ocean. An instrument which conveniently accomplishes this is useful not only to biologists and oceanographers but also to the fishing industry.

It is an object of the present invention to provide a suitable apparatus for this purpose which shall be light in weight and compact enough to make it easily portable and which at the same time is convenient in use and sufficiently rugged so that it can readily be handled by untrained personnel.

The bathythermograph according to the present invention is preferably in the form of a device which can readily be lowered from a ship into the ocean to the maximum depth to which it may be desired to measure the change in temperature, and which produces a continuous record of temperature versus depth.

Figure 1:
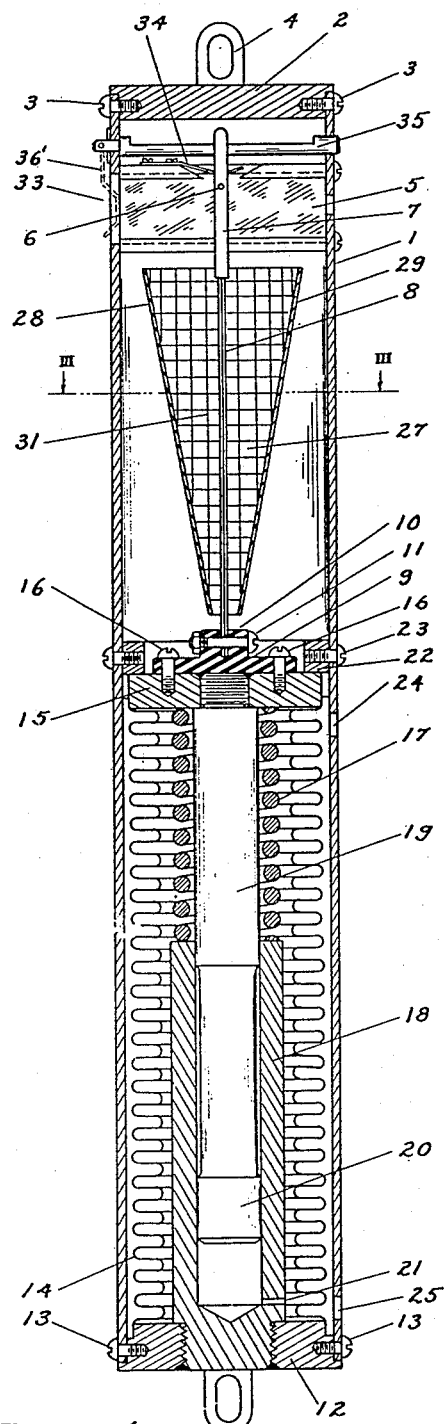
Figure 2:
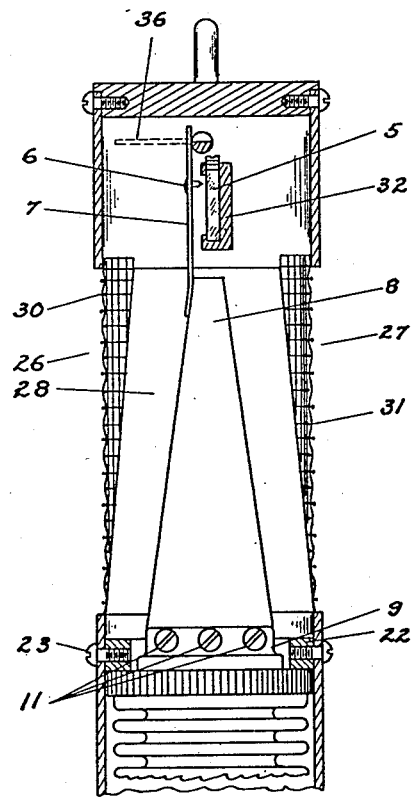
Figure 3:
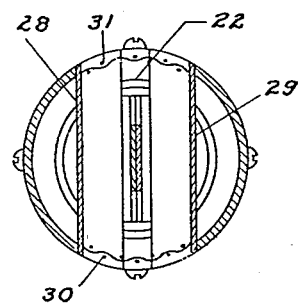
Figure 7:
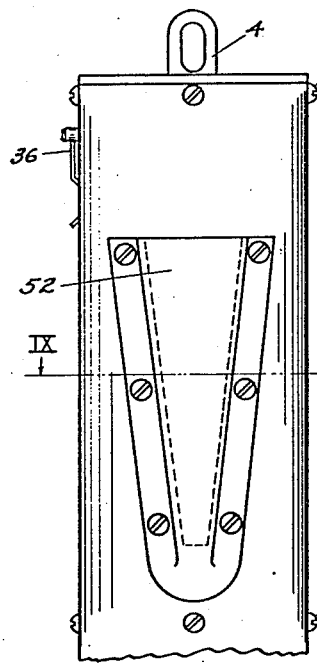
Figure 8:
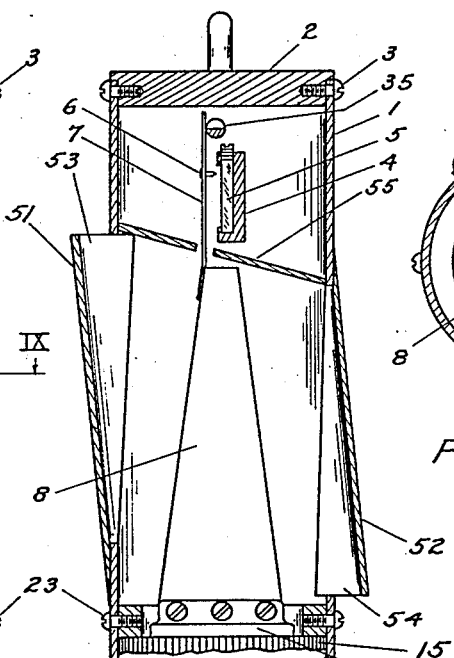
Figure 9:
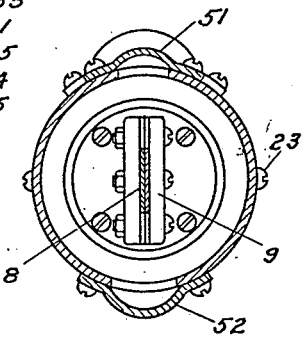
Figure 10:
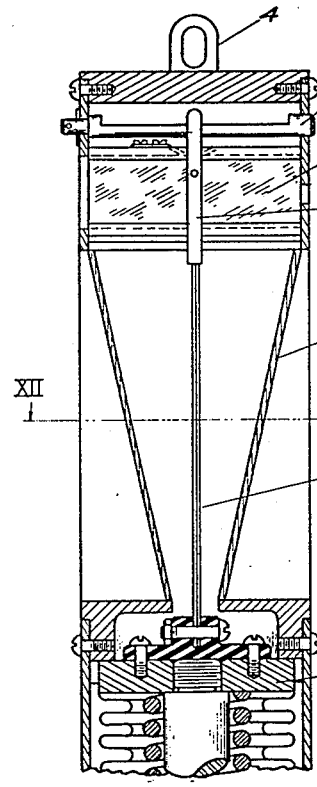
Figure 11:
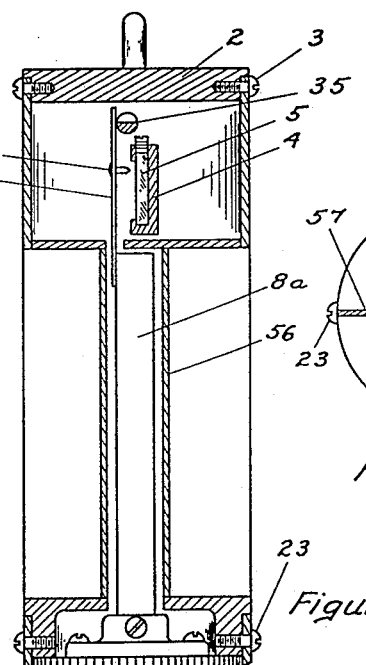
Figure 12:
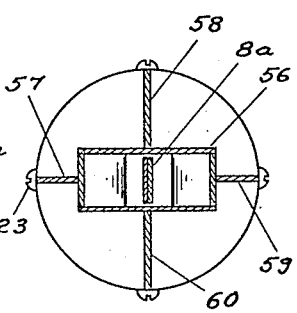

Other objects of the present invention will appear from the following description taken in connection with the accompanying drawings in which Fig. 1 is a longitudinal cross section of an instrument according to the present invention; Fig. 2 is a longitudinal cross section taken at right angles to that of Fig. 1; Fig. 3 is a cross section taken on the line III—III of Fig. 1; Fig. 4 is a longitudinal partial section of a modification of the device shown in Fig. 1; Fig. 5 is a partial section taken at right angles to that of Fig. 4; Fig. 6 is a plan view of the device as shown in Fig. 4; Figs. 7, 8 and 9 are views of a modification of the arrangement of the thermal element, Fig. 7 being an elevation, Fig. 8 a longitudinal cross-section and Fig. 9 a cross-section along the line IX—IX in Fig. 7; Figs. 10, 11 and 12 are views of a further modification of the thermal element, Fig. 10 being a longitudinal cross-section, Fig. 11 a longitudinal cross-section taken at right angles to that of Fig. 10 and Fig. 12 a cross-section along the line XII—XII in Fig. 10.

In the modification shown in Figs. 1, 2 and 3 the device comprises the cylindrical casing 1 closed at the upper end by a cap 2 held in the casing by screws 3 and carrying an eye 4 to which the lowering rope or cable may be fastened. The upper half of the casing contains a recording mechanism and a temperature-responsive element while the lower half of the casing contains a pressure-responsive element.

The record medium is in the form of a suitably coated glass slide 5 mounted edgewise near the top of the casing. The record is inscribed thereon by a stylus 6 which is actuated simultaneously by both the temperature- and pressure-responsive elements. The stylus is mounted in a light spring member 7 which is fixed to the end of the temperature-responsive element.

The latter comprises an elongated bimetallic strip 8, trapezoidal in shape, and supported substantially along the axis of the cylinder by a clamping device which comprises an insulating element 9 having a raised portion 10 provided with a slot into which the wide end of the bimetallic strip 8 is fitted and held by the bolts 11. The bimetallic element 8, when subjected to changes in temperature, will bend in such a manner as to give the stylus 6 a substantially horizontal motion as seen in Fig. 1, thereby sweeping the stylus across the plate 5. The insulating plate 9 is carried by the pressure-responsive element which will now be described.

In the lower end of the cylinder there is mounted a metallic ring 12 held in place by screws 13. To the inside of the ring 12, one end of a metallic bellows 14 is secured in such a manner as to make a watertight joint. The upper end of the metallic bellows is fastened to a ring member 15 to which the insulating plate 9 is secured by means of the screws 16. The outer surface of the ring 15 is serrated to permit water to flow between it and the casing 1.

Within the bellows there is mounted a helical spring 17 which bears against the ring member 15 and a hollow cylinder 18 closed at its lower end and threaded into the ring 12. A rod 19, threaded at its upper end into the ring 15, serves as a guide for the spring 17 and terminates at its lower end in a piston 20 adapted to slide freely within the cylinder 18. At the lower end of the cylinder 18 there is provided a restricted air passage 21 leading to the inside of the metallic bellows. All joints with the metallic bellows are made watertight so that the whole unit is hermetically sealed. Expansion of the spring 17 is limited by the ring 22 fastened to the cylinder by screws 23. The ring serves as a stop which engages the member 15 and limits its upward motion.

Water is free to flow into the space between the metallic bellows and the cylindrical casing through the apertures 24 and 25, as well as through the larger apertures 26 and 27 formed in the upper part of the casing. The latter openings are relatively large and are shaped substantially like the shape of the bimetallic strip but inverted so that the wide portion of the openings is opposite the narrow portion of the bimetallic strip, and vice versa. In order to reduce vibration of the bimetallic strip, due to water currents, baffle plates 28 and 29 are placed inside the cylinder from the edge of one aperture to the corresponding edge of the opposite aperture. Screens 30 and 31 cover the apertures to prevent large foreign bodies from getting into the instrument.

In place of using a bimetallic strip, any other suitable temperature-responsive element which will actuate the stylus or other marking means at substantially right angles to its motion due to the pressure-responsive means may be employed, if desired.

The record plate 5 is preferably a small glass slide prepared for the record by being coated with a suitable waterproof substance such as a thin layer of oil which is then smoked to blacken it. The function of the oil is to prevent the smoked film from being washed off by the sea water. The plate is held rigidly in the body of the instrument in a channeled frame 32 which is fastened to the cylinder 1. A slot 33 is provided in the cylinder 1 through which the record plates may be inserted and extracted. A leaf spring 34, secured to the plate carrier 32, provides sufficient friction to hold the plate in position.

While the instrument is out of use and while record plates are being inserted or withdrawn, the stylus is held out of contact with the plate by the eccentric bar 35 journaled in the outer casing and provided at one end with a wire 36 or other suitable means whereby it can be turned. The wire 36 is conveniently made to serve not only for the purpose of operating the eccentric 35, but also for holding the glass slide in position when the instrument is in use. In Fig. 2 the wire 36 is shown in its position in which the stylus is held away from the record plate. In Fig. 1 the other position of the wire is shown dotted at 36', in which position it bears against the plate 5.

In operation, after the record plate has been inserted, the eccentric 35 is rotated, permitting the spring 7 to press the stylus 6 against the plate. The instrument can then be lowered into the water at a fairly rapid rate. The temperature of the water, affecting the bimetallic strip 8, will cause the stylus to take up a corresponding position from left to right as viewed in Fig. 1. As the instrument descends, the increasing water pressure, acting upon the plate 15, forces it downward, compressing the spring 17, thereby causing the stylus 6 to move vertically downwards as viewed in Figs. 1 and 2 and to take a position at all times corresponding to the depth. The stylus position, therefore, is at all times the resultant of the temperature and pressure deflections so that as the instrument descends, the stylus traces a curve of pressure or depth against temperature.

After the instrument has been properly calibrated, the records may be observed by transmitted light superimposed on a calibrated grid. In practice, it is convenient to observe an enlarged image of the record projected optically on to an enlarged calibration grid. If desired, photographic copies of the record, enlarged to any convenient size, can readily be made, or alternatively, the projected image of the curve made by the stylus may be traced manually on a suitably calibrated sheet of graph paper. In practice, the instrument is preferably made with pressure and temperature elements substantially twice as long as those shown in Fig. 1.

A modification of the instrument is shown in Figs. 4, 5 and 6. The pressure element in this modification is the same as that shown in Figs. 1 to 3, although it can be made, as shown, twice as long for the same total length of instrument. Instead of a flat bimetallic strip, the temperature-responsive element is made in the form of a spiral bimetallic strip 40 secured at one end by screws 41 to an angle bracket 42 rigidly fixed to the plate 15 by the screws 43. A longitudinal slot 44 is cut in the cylindrical casing 1, to enable the element 40 to move up and down with variations in pressure. The opposite end of the bimetallic strip 40 carries the stylus 45 which bears against the record plate 46 held in a suitable carrier 47 secured to the outer surface of the casing. In order to protect the temperature-responsive element from accidental damage, a cylindrical guard 48 is placed around the upper part of the instrument and secured to the casing 1 by the screws 49 and the spacers 50.

It will be evident from the drawing that temperature variations will cause the spiral 40 to expand and contract, thereby drawing the stylus transversely across the plate 46 while pressure variations will move the stylus up and down vertically. Thus with this modification a record can be obtained similar to that obtained in the modification previously described. Moreover, the trace of the stylus in the modification of Figs. 4 to 6 will be exactly linear whereas in the modification of Figs. 1 to 3 temperature variations will cause the stylus to describe an arc whose radius is dependent upon the length of the bimetallic strip employed.

In the modification shown in Figs. 7, 8 and 9 means are provided to induce a rapid flow of water through the instrument without producing eddies or other currents which tend to vibrate the bimetallic strip. In place of the screens 30 and 31, as shown in Figs. 1 and 2, the V-shaped apertures in the cylindrical casing 1 are partially covered by aprons 51 and 52 which are substantially semi-conical in cross section as shown in sectional view in Fig. 9. These aprons have flanges along their edges by means of which they may be screwed to the casing 1 as shown. One of the aprons has its open end 53 facing the upper end of the instrument while the other apron 52 has its open end 54 facing the lower end of the instrument. Just above the apron 51 and the bimetallic strip a shielding member 55 is provided having an aperture through which the stylus-carrying member can project. The record slide and the stylus are therefore maintained in a region of substantially quiet water. Thus, when the instrument is being lowered, water will enter the apron 52 at 54 and proceed in an upper direction toward the opening 53 of the apron 51. Water currents tending to move towards the upper part of the instrument are deflected by the shield 55. It will also be noted that the motion of the water through the instrument is in a direction substantially parallel to the surface of the bimetallic strip and therefore does not tend to produce vibration of the latter. When the instrument is raised, the flow of water is reversed, namely in at 53 and out at 54. Vibration of the bimetallic strip and of the stylus can be considerably reduced by this means while at the same time insuring the thermal element of contact with water at a temperature corresponding to the instrument's depth at all times.

In Figs. 10, 11 and 12 a modified arrangement of the thermal element is shown. Here the bimetallic strip 8a is rectangular in shape and is mounted within a shallow chamber 56 trapezoidal in shape and rectangular in cross section. The thickness of the chamber is made just sufficient to accommodate the width of the bimetallic strip in order that the volume of the chamber may be reduced as much as possible. On the outside of the chamber 56 are mounted four or more fins 57 to 60 to assist in providing rapid heat conduction to and from the interior of the chamber. The marking stylus and record slide are mounted within a separate compartment on the upper part of the instrument as shown. This construction has the advantage of avoiding all possibility of vibration of the thermal element due to water currents, and since the chamber 56 is filled with water, vibrations due to other causes are considerably damped. Thus this modification is particularly adapted for use where the temperature range is relatively small and very sensitive thermal elements must be employed.

Having now described my invention, I claim:

1. A bathythermograph comprising a hydrostatic pressure-responsive element, a temperature-responsive element, a record plate, a stylus for marking on said plate, means mounting said stylus on said temperature element so as to be actuated thereby in one direction and means mounting said temperature element upon said pressure element so that said stylus is actuated by the latter in a direction substantially at right angles to its direction of actuation by said temperature element, whereby said stylus describes a path which is the resultant of pressure and temperature deflections.

2. A bathythermograph including a submersible casing open to admit water to its interior, a pressure-responsive spring-tensioned hermetically sealed metallic bellows secured by one end in said casing and axially movable at the other end in response to pressure variations, a bimetallic temperature-responsive element secured by one end to the movable end of said bellows, the free end of said element being adapted to move in a direction different from the axis of said bellows, a stylus mounted on the free end of said element and record means fixed with respect to the casing adapted to be marked by said stylus whereby a graph of pressure against temperature is produced.

3. In a bathythermograph, a recording member, a temperature-responsive element for actuating the same, a pressure-responsive element for actuating the recording member in a direction substantially at right angles to the direction of actuation by said temperature-responsive element, a casing surrounding the temperature-responsive element, said casing being provided with a pair of elongated apertures in its outer surface disposed opposite each other and a pair of semi-conical aprons covering said apertures, one apron being open at one end to permit free passage of water into the instrument and the other apron being open at the opposite end to permit free passage of water out of the instrument.

4. A bathythermograph including an element responsive to variations of pressure of a liquid medium in which it is immersed, an element responsive to variations of temperature of said liquid, a record member having two coordinate axes in different directions, a recording element for marking on said member and means for actuating said recording element by said pressure-responsive element along one of said coordinate axes and for actuating said recording element by said temperature-responsive element along the other of said coordinate axes.

5. In a bathythermograph a recording member, a thin elongated bimetallic temperature-responsive element for actuating the same, a pressure-responsive element for actuating the recording member in a direction substantially at right angles to the direction of actuation by said temperature-responsive element, a casing surrounding the temperature-responsive element, said casing being provided with a pair of elongated apertures in its outer surface disposed opposite each other and opposite the thin dimension of said bimetallic element and means partially covering said apertures for providing free access of water to said temperature-responsive element but inhibiting rapid water current flows tending to vibrate the same.

6. A bathythermograph comprising an elongated casing having a longitudinal axis with a record plate located substantially in said axis, a temperature-responsive element positioned within said casing and having a stylus adapted to be moved by said temperature-responsive element in an arc across said record plate, and a pressure-responsive element positioned within said casing and means operative thereby to produce a relative motion of said record plate and stylus substantially at right angles to the motion caused by the temperature-responsive element.

7. A bathythermograph comprising a submersible unit having an outer elongated protecting casing with an opening to admit water to the interior, said casing having mounted therein a recording plate, a hydrostatic pressure-responsive-element, a temperature-responsive element, a recording element, means coupling both the pressure-responsive element and the temperature-responsive element to the recording element for movement of the recording element across the record plate with one of said responsive elements moving said recording element in a direction substantially at right angles to the direction of movement of the same by the other of said responsive elements and shielding means positioned adjacent to the temperature-responsive element to protect the same from vibration-producing currents.

A. F. SPILHAUS.